United States Patent
Kang et al.

(10) Patent No.: US 11,453,971 B2
(45) Date of Patent: Sep. 27, 2022

(54) WASHING MACHINE WITH CIRCULATING WATER SUPPLY PIPE AND MANUFACTURING METHOD OF CIRCULATING WATER SUPPLY PIPE

(71) Applicant: LG Electronics Inc., Seoul (KR)

(72) Inventors: Dongwon Kang, Seoul (KR); Hyeonsik Lee, Seoul (KR); Gyuri Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 16/779,235

(22) Filed: Jan. 31, 2020

(65) Prior Publication Data
US 2020/0283945 A1   Sep. 10, 2020

(30) Foreign Application Priority Data
Feb. 1, 2019   (KR) .................. 10-2019-0013998

(51) Int. Cl.
| | |
|---|---|
| *A47L 15/00* | (2006.01) |
| *D06F 39/08* | (2006.01) |
| *B29C 49/04* | (2006.01) |
| *B29C 49/20* | (2006.01) |
| *B29C 49/42* | (2006.01) |

(Continued)

(52) U.S. Cl.
CPC ............ *D06F 39/085* (2013.01); *B29C 49/04* (2013.01); *B29C 49/20* (2013.01); *B29C 49/4273* (2013.01); *D06F 37/266* (2013.01); *D06F 39/088* (2013.01); *B29C 2049/2021* (2013.01); *B29L 2023/22* (2013.01)

(58) Field of Classification Search
CPC .................................................. D06F 39/085
See application file for complete search history.

(56) References Cited

U.S. PATENT DOCUMENTS

| | | | |
|---|---|---|---|
| 6,110,412 A | 8/2000 | Anderson | |
| 2006/0150687 A1* | 7/2006 | Chang | D06F 39/083 68/24 |
| 2016/0053422 A1* | 2/2016 | Im | D06F 33/34 68/12.05 |

FOREIGN PATENT DOCUMENTS

| | | |
|---|---|---|
| CN | 2003266529 | 9/2003 |
| CN | 1715679 | 1/2006 |

(Continued)

OTHER PUBLICATIONS

Office Action in Chinese Appln. No. 202010085475.0, dated Mar. 3, 2022, 16 pages (with English translation).

*Primary Examiner* — Jason Y Ko
(74) *Attorney, Agent, or Firm* — Fish & Richardson P.C.

(57) ABSTRACT

The present disclosure provides a washing machine and a manufacturing method of a circulating water supply pipe. The washing machine includes a casing having a front surface on which a laundry inlet is formed, a tub which is disposed in the casing and has an opening at a front surface thereof, a drum which is rotatably provided in the tub, a pump which pressure-feeds water discharged from the tub, a gasket which forms a passage connecting the laundry inlet and the opening to each other, a plurality of nozzles which is provided on an inner peripheral surface defining the passage of the gasket and injects the water pressure-fed by the pump into the drum, and a circulating water supply pipe which is disposed on an outer peripheral surface of the gasket opposite to the inner peripheral surface and guides the water pressure-fed by the pump to the plurality of nozzles.

15 Claims, 10 Drawing Sheets

(51) Int. Cl.
*D06F 37/26* (2006.01)
*B29L 23/00* (2006.01)

(56) References Cited

FOREIGN PATENT DOCUMENTS

| | | |
|---|---|---|
| CN | 101831777 | 9/2010 |
| CN | 202786832 | 3/2013 |
| CN | 105274779 | 1/2016 |
| KR | 20190005248 | 1/2019 |

* cited by examiner

FIG. 10A
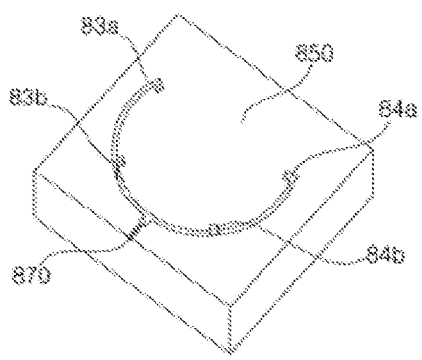
FIG. 10B
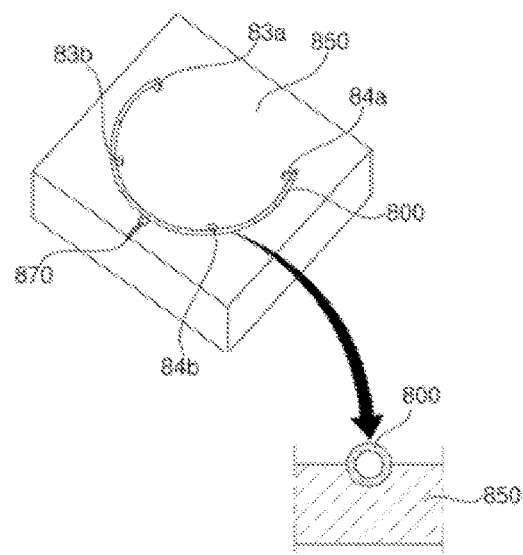
FIG. 10C
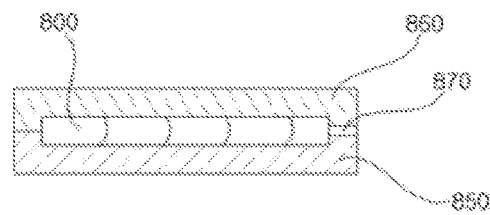
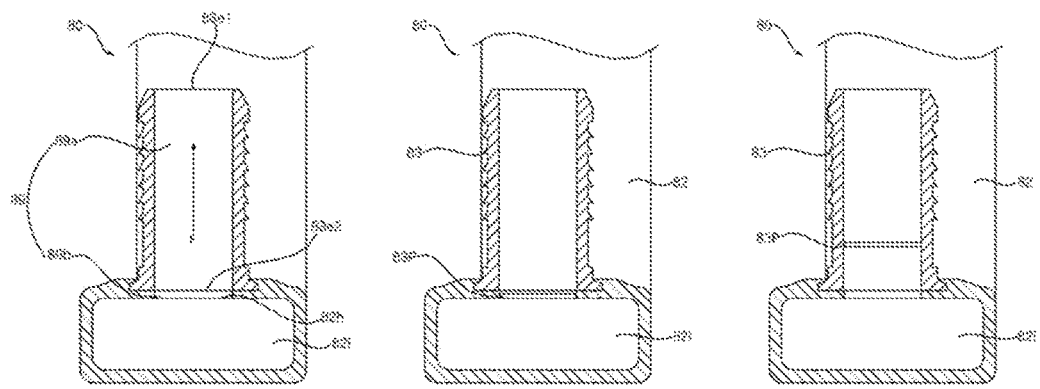
FIG. 11A	FIG. 11B	FIG. 11C

WASHING MACHINE WITH CIRCULATING WATER SUPPLY PIPE AND MANUFACTURING METHOD OF CIRCULATING WATER SUPPLY PIPE

CROSS-REFERENCE TO RELATED APPLICATION

This application claims the benefit of priority to Korean Application No. 10-2019-0013998, filed on Feb. 1, 2019. The disclosure of the prior application is incorporated by reference in its entirety.

BACKGROUND OF THE INVENTION

Field of the Invention

The present disclosure relates to a washing machine, and more particularly, to a washing machine having a nozzle for injecting water which is discharged from a tub and circulates along a circulation pipe into a drum.

Related Art

A washing machine is known, which includes a tub having a front surface on which an inlet is formed and a drum which rotates in the tub. An annular gasket for preventing water in the tube from leaking is provided around the inlet of the tub. Circulation nozzles for injecting the water circulated by a circulation pump into the drum is formed in the gasket.

A circulating water supply pipe for guiding the water pressure-fed by the circulation pump to the circulation nozzles is coupled to a periphery of the gasket. The circulating water supply pipe includes a conduit which guides the circulating water pressure-fed by the circulation pump along a predetermined path, a plurality of ports extends from the conduit, and the circulating water is supplied to the circulation nozzles through the ports.

Generally, this type of circulating water supply pipe is formed by extrusion molding. FIG. 9A schematically illustrates a state where molds are joined to each other according to a manufacturing method (extrusion molding) of the related art, and FIG. 9B is a state where the mold is open.

As illustrated in FIGS. 9A and 9B, when the circulating water supply pipe is extruded according to the method of the related art, after a pair of melted parison sheets 810 and 820 abuts on each other to be disposed between a left mold 830 and a right mold 840, air is injected between the pair of parison sheets. Accordingly, the parisons are expanded by the injected air, and a shape such as a cavity (formed in a shape corresponding to an outline of the feeding conduit) formed in the cavities 830 and 840 is formed.

Meanwhile, in the above-described method, after a molding product is extracted from the molds 830 and 840, processing such as cutting to completely separate a portion where both molds 830 and 840 abut on each other from the parisons or trimming a joint portion between the parisons is necessary, and molding steps and scraping of parting lines occur. Accordingly, there is a concern that leakage may occur.

Moreover, there is a problem that many discarded portions such as portions indicated by diagonal lines in FIG. 9B are generated.

SUMMARY OF THE INVENTION

The present disclosure provides a washing machine manufactured using an improved manufacturing process of a circulating water supply pipe for supplying circulating water to a plurality of nozzles formed in a gasket and a manufacturing method of the circulating water supply pipe.

The present disclosure also provides a manufacturing method capable of smoothly manufacturing an inner surface of a discharge port which is provided in the circulating water supply pipe and communicates with a nozzle.

The present disclosure also provides a washing machine which removes a residue of a parison attached to the inner surface of the discharge port so as to prevent the residue from being ejected into a drum when a user uses the washing machine.

Objects of the present disclosure are not limited to the objects mentioned above, and other objects not mentioned will be clearly understood by a person skilled in the art from the following description.

In an aspect, there is provided a washing machine including: a casing having a front surface on which a laundry inlet is formed; a tub which is disposed in the casing and has an opening formed on a front surface of the tub; a drum which is rotatably provided in the tub; a pump which pressure-feeds water discharged from the tub; a gasket which forms a passage connecting the laundry inlet and the opening to each other; a plurality of nozzles which is provided on an inner peripheral surface defining the passage of the gasket and injects the water pressure-fed by the pump into the drum; and a circulating water supply pipe which is disposed on an outer peripheral surface of the gasket opposite to the inner peripheral surface and guides the water pressure-fed by the pump to the plurality of nozzles.

The circulating water supply pipe includes an inlet port into which the water pressure-fed from the pump flows, a feeding conduit which guides the water introduced through the inlet port, and a plurality of discharge ports which protrudes from the feeding conduit toward the gasket and distributes the water guided along the feeding conduit to the plurality of nozzle.

A discharge flow path surface which defines a discharge flow path communicating with the nozzle is formed inside the discharge port, and a parting line made of the same material as that of the feeding conduit is formed on the discharge flow path surface.

The parting line may be formed in a ring shape along a periphery of the discharge flow path surface. Alternatively, the parting line may be formed in an arc shape along a periphery of the discharge flow path surface.

The feeding conduit may include an inner diameter portion through which the water introduced from the inlet port flows, the inner diameter portion of the feeding conduit may include a plurality of communication ports communicating with the discharge flow path, and the discharge flow path surface may be formed to extend to the communication port.

The discharge flow path surface may include a first discharge flow path surface which is formed inside the discharge port, and a second discharge flow path surface corresponding to the communication port of the feeding conduit.

The parting line may be formed on the first discharge flow path surface. The parting line may be formed to be closer to an end connected to the feeding conduit of the discharge port than to an end of the discharge port facing the nozzle.

Moreover, the parting line may be formed on the second discharge flow path surface.

In another aspect, there is provided a manufacturing method of a circulating water supply pipe, the manufacturing method including: inserting a stopper into a plurality of discharge ports; locating the plurality of discharge ports into which the stopper is inserted in a cavity of a lower mold, extruding a raw material to form a melted parison having a hollow; placing the parison in the cavity of the lower mold; joining an upper mold and the lower mold to each other; injecting a gas into the hollow; opening the upper mold and the lower mold; extracting a molding product obtained by joining the parison and the plurality of discharge ports to each other from the cavity; and separating the stopper inserted into the plurality of discharge ports.

The manufacturing method of a circulating water supply pipe may further include removing the parison in the plurality of discharge ports after separating of the stopper.

Details of other embodiments are included in a detail description and the drawings.

BRIEF DESCRIPTION OF THE DRAWINGS

FIGS. 10A to 10C are view illustrating step by step the manufacturing method of the circulating water supply pipe according to the embodiment of the present disclosure.

FIGS. 11A to 11C are cross-sectional views illustrating a discharge port and a feeding conduit of the circulating water supply pipes and are cross-sectional view illustrating that a parting line is formed in a manufacturing process of the circulating water supply pipe.

DESCRIPTION OF EXEMPLARY EMBODIMENTS

Figure 1:
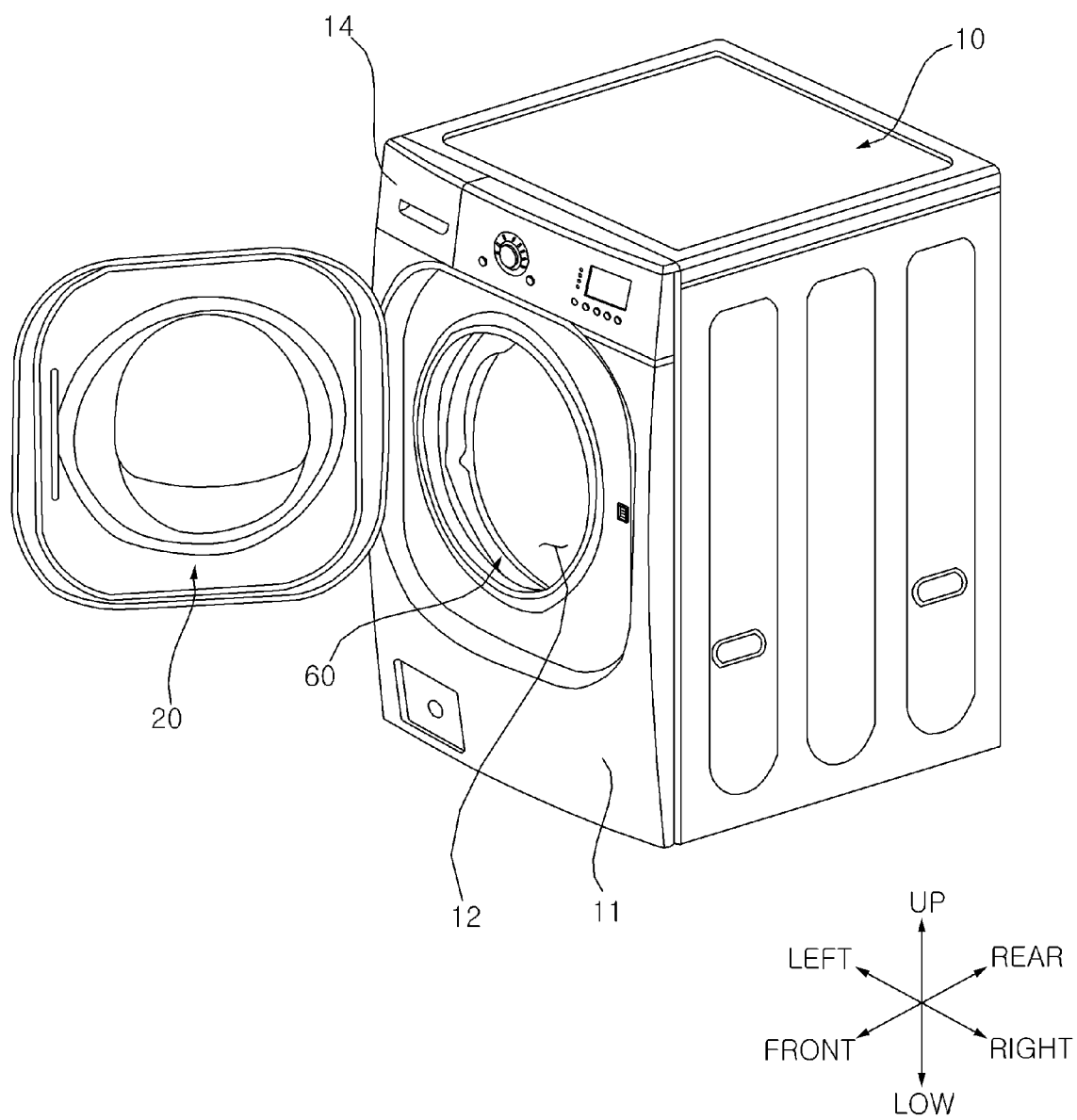
FIG. 1 is a perspective view illustrating a washing machine according to an embodiment of the present disclosure.

Advantages and features of the present disclosure and methods of achieving them will be apparent with reference to embodiments described below in detail in conjunction with the accompanying drawings. However, the present disclosure is not limited to the embodiments disclosed below, but may be implemented in various forms. The present embodiments are merely provided to complete the disclosure of the present disclosure and to fully inform a person skilled in the art of the present disclosure of the scope of the present disclosure, and the present disclosure is defined by the scope of claims. The same reference numerals refer to the same elements throughout.

Hereinafter, the present disclosure will be described with reference to the drawings in order to describe a washing machine according to embodiments of present disclosure.

Figure 2:
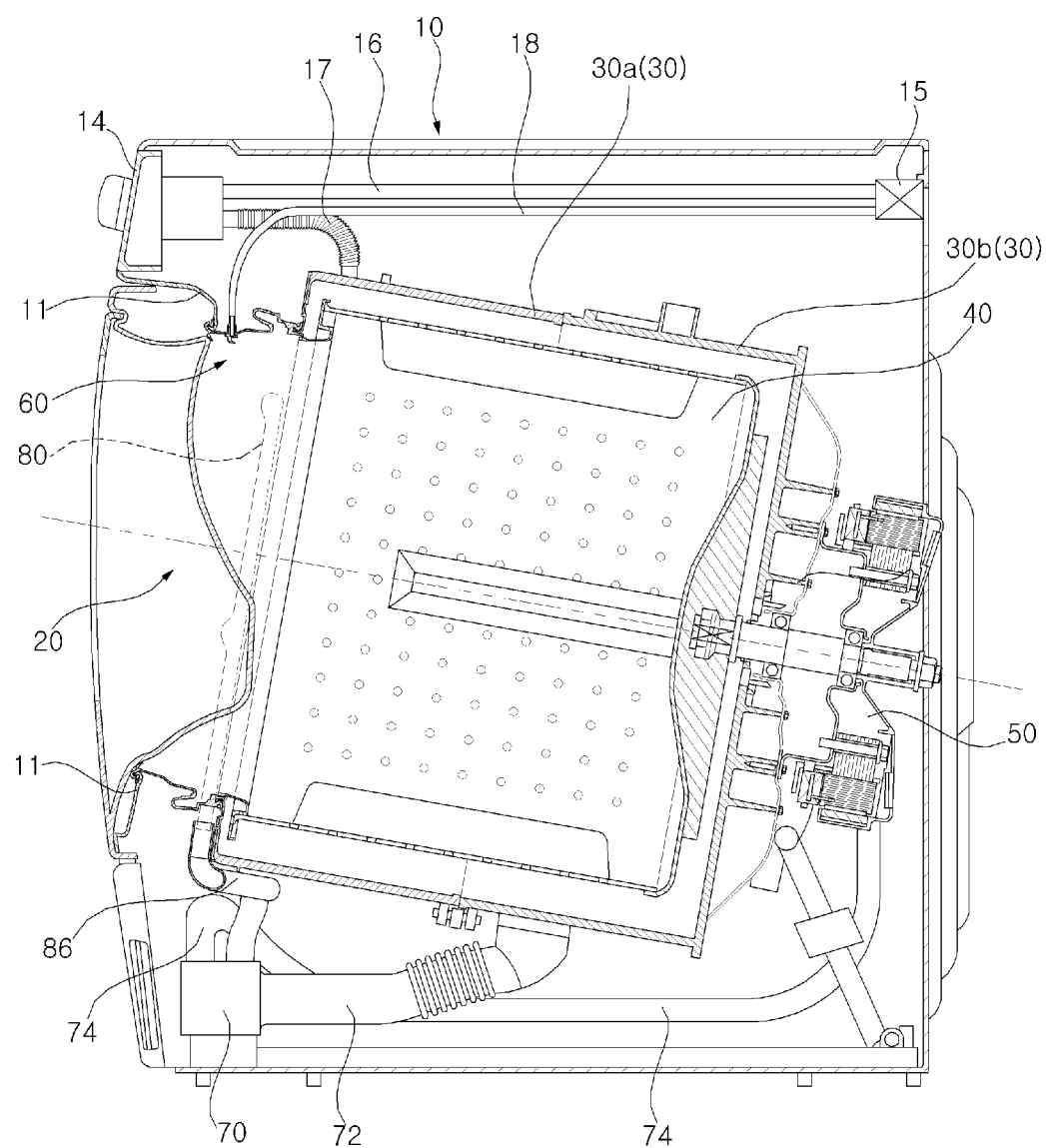
FIG. 2 is a cross-sectional view of the washing machine illustrated in FIG. 1.

Referring to FIGS. 1 and 2, a washing machine according to an embodiment of present disclosure includes a casing 10 for forming an exterior, a tub 30 for storing wash water, and a drum 40 which is rotatably provided in the tub 30 and into which laundry is introduced. In addition, the washing machine may include a motor 50 (hereinafter, may be referred to as "drive unit") for rotating the drum.

A front panel 11 having a laundry inlet 12 is disposed on a front surface of the casing 10, a door 20 for opening or closing the laundry inlet 12 is disposed in the front panel 11, and a dispenser 14 into which a detergent is input may be provided in the front panel 11.

Moreover, a water supply valve 15, a water supply pipe 16, and a water supply hose 17 are installed inside the casing 10, washing water which has passed through the water supply valve 15 and the water supply pipe 16 is mixed with the detergent in the dispenser 14 when water is supplied, and thereafter, may be supplied to a tub 30 through the water supply hose 17.

Meanwhile, a direct water supply pipe 18 is connected to the water supply valve 15, and thus, the washing water is not mixed to the detergent and is directly supplied into the tub 30 through the direct water supply pipe 18.

Moreover, a pump 70 and a circulating water supply pipe 80 is installed, the pump 70 and the tub 30 are connected to each other by a discharge hose 72, and the circulating water supply pipe 80 and the pump 70 may be directly connected to each other or may be connected to each other by a connection pipe 86. Accordingly, when the pump 70 is operated, the washing water stored in the tub 30 may be injected into the drum 40 through the circulating water supply pipe 80 to be circulated. The pump 70 is connected to a drain pipe 74, and thus, the washing water may be discharged to the outside through the drain pipe 74.

As described above, the pump 70 according to the embodiment of the present disclosure functions as a drain pump for discharging the washing water to the outside and a circulation pump for circulating the washing water. However, unlike to this, the drain pump and the circulation pump may be separately provided, and when the drain pump and the circulation pump are separately provided, it is natural that the drain pipe 74 is connected to the drain pump and the connection pipe 86 is connected to the circulation pump.

Meanwhile, the tub 30 may be formed as a single tub body or first and second tub bodies 30a and 30b may be formed to be fastened to each other. In the present embodiment, a case where the first and second tub bodies 30a and 30b are fastened to each other to from the tub 30 is described as an example. Hereinafter, the first tub body 30a is simply referred to as the "tub 30".

The tub 30 is disposed inside the casing 10 and an opening (32, refer to FIG. 4) corresponding to the laundry inlet 12 formed on the front panel 11 is formed at a front portion of the tub 30.

The drum 40 in which the laundry is accommodated is rotatably provided in the tub 30. The drum 40 accommodates the laundry, includes an inlet through which the laundry is input and which is disposed on a front surface thereof, and rotates about a rotation center line which is substantially horizontal. However, the term "horizontal" is not a term used in a mathematically exact sense. That is, as in the embodiment, when the rotation center line is inclined at a predetermined angle with respect to the horizontal, it may also be said to be substantially horizontal because it is closer to the horizontal than the vertical. A plurality of through holes may be formed such that the water in the tub 30 flows into the drum 40 through the through holes.

A plurality of lifters may be provided on an inner surface of the drum 40. The plurality of lifters may be disposed to have a predetermined angle with respect to a center of the drum 40. When the drum 40 rotates, the laundry is repeatedly lifted and dropped by the lifters.

The drive unit 50 for rotating the drum 40 may be further provided, and a drive shaft rotated by the drive unit 50 may pass through a rear surface of the tub 30 and may be coupled to the drum 40.

Preferably, the drive unit 50 may be configured to include a direct type washing motor, and the washing motor may include a stator which is fixed to a rear side of the tub 30 and a rotor which is rotated by a magnetic force acting between the stator and the rotor. The drive shaft may be integrally rotated with the rotor.

Figure 3:
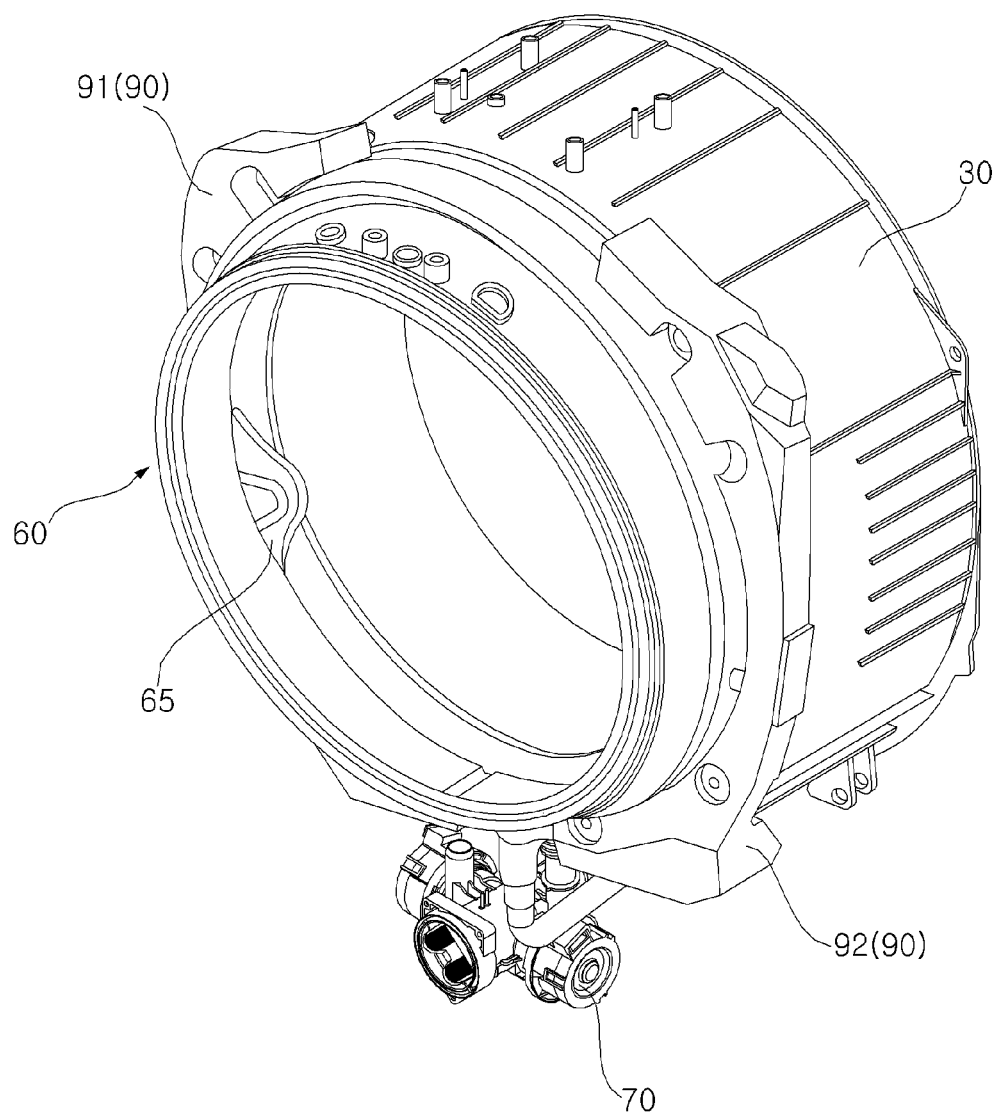
FIG. 3 is a view illustrating a portion of the washing machine according to the embodiment of the present disclosure.
Figure 4:
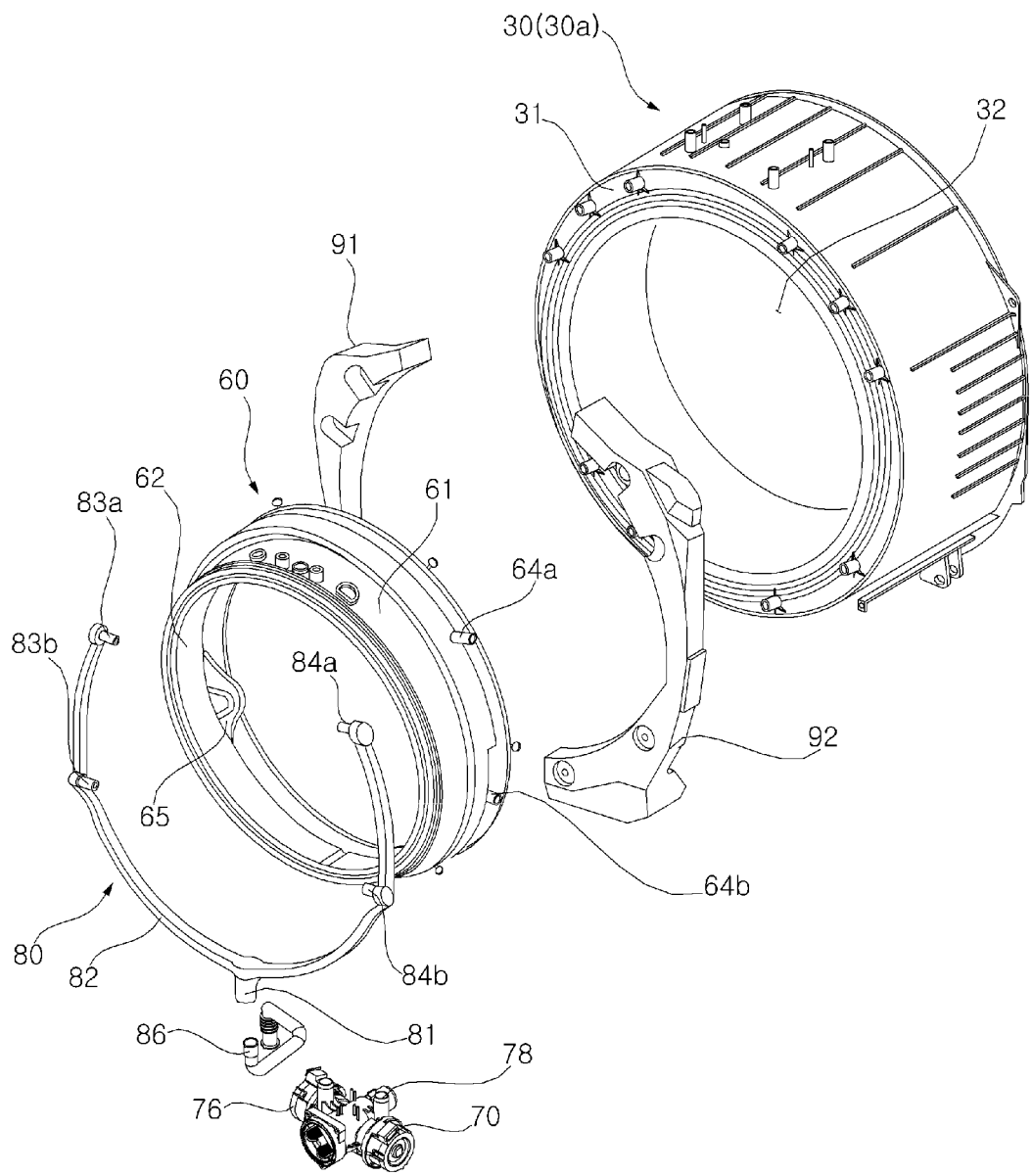
FIG. 4 is an exploded perspective view of an assembly illustrated in FIG. 3.

Referring to FIGS. 3 and 4, the washing machine according to the embodiment of the present disclosure includes a gasket 60 which connects the casing 10 and the tub 30 to each other, a plurality of nozzles 66 and 67 which injects water into the drum 40, the pump 70 which pressure-feeds the water discharged from the tub 30, and the circulating water supply pipe 80 which guides the water pressure-fed by the pump 70 to the plurality of nozzles 66 and 67. In addition, the washing machine may include the connection pipe 86 which guides the water pressure-fed from the pump 70 to the circulating water supply pipe 80 and a balancer 90 which is disposed on a front surface of the tub.

The plurality of nozzles 66 and 67 may be provided on an inner peripheral surface 62 of the gasket 60 described later. The nozzles 66 and 60 include first and second nozzles 66 and 67 which are respectively disposed on both left and right sides of the inner peripheral surface 62 of the gasket 60. The first nozzle 66 is disposed on the left side of the inner peripheral surface 62 of the gasket 60 and the second nozzle 67 is disposed on the right side of the inner peripheral surface 62 of the gasket 60.

A plurality of first nozzles 66 and a plurality of second nozzles 67 may be respectively provided. In the embodiment of the present embodiment, two first nozzles 66 and two second nozzles 67 are provided. However, the present disclosure is not necessarily limited thereto.

The first nozzle 66 may include a first lower nozzle 66b which is disposed below a center of the gasket 60 and a first upper nozzle 66a which is disposed above the first lower nozzle 66b. The first upper nozzle 66a may be disposed above the center of the gasket 60.

The second nozzle 67 may include a second lower nozzle 67b which is disposed below the center of the gasket 60 and a second upper nozzle 67a which is disposed above the second lower nozzle 67b. The second upper nozzle 67a may be disposed above the center of the gasket 60.

The first and second lower nozzles 66b and 67b inject circulating water into the drum 40 and may inject upward. The first and second upper nozzles 66a and 67a inject the circulating water into the drum 40 and may inject downward. The circulating water means water which is discharged from the tub 30 so as to be pressure-fed by the pump 70, guided by the circulating water supply pipe 80, and injected into the drum 40 through the nozzles 66 and 67.

The gasket 60 may include a direct water nozzle which directly injects the water into the drum 40 and the direct water supply pipe 18 which guides the water supplied through the water supply unit to the direct water nozzle. The direct water nozzle may be a vortex nozzle or a spray nozzle but is not necessarily limited thereto. When viewed from the front side, the direct water nozzle may be disposed on a vertical line OV. A window 20 further protrudes toward the drum 40 than the direct water nozzle, a water stream can come into contact with the window 22, and thus, in this case, the window 22 can be washed.

Figure 5:
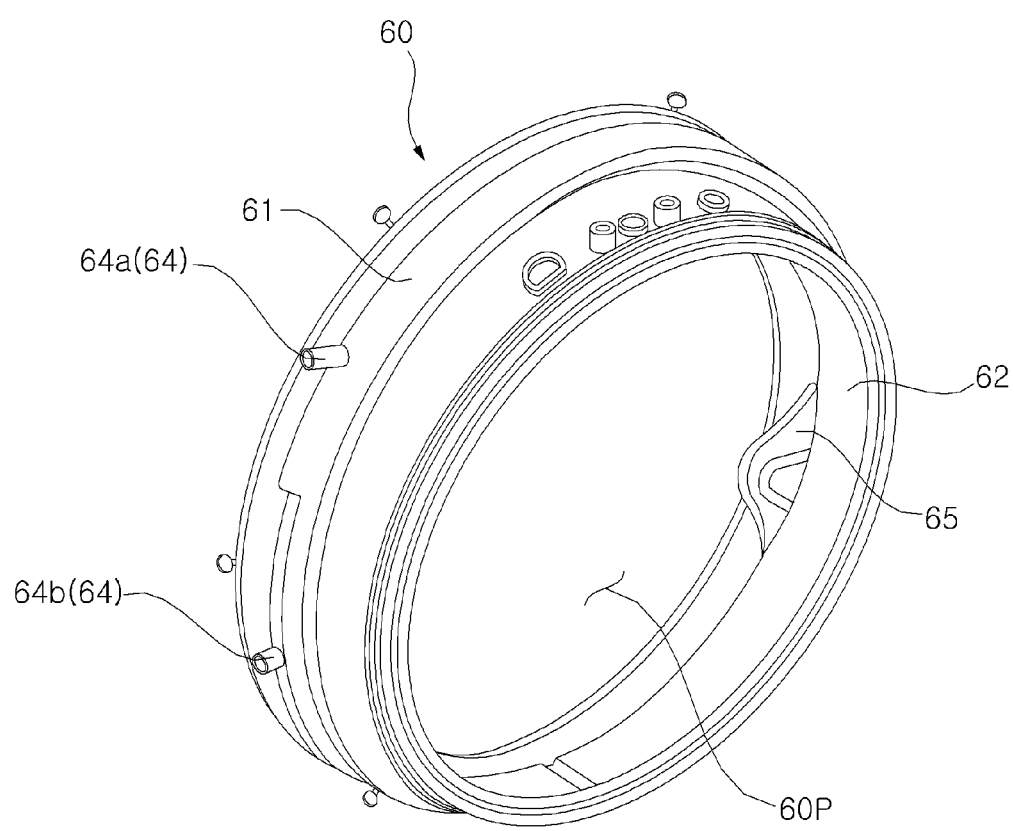
FIG. 5 is a perspective view of a gasket illustrated in FIG. 4.
Figure 6:
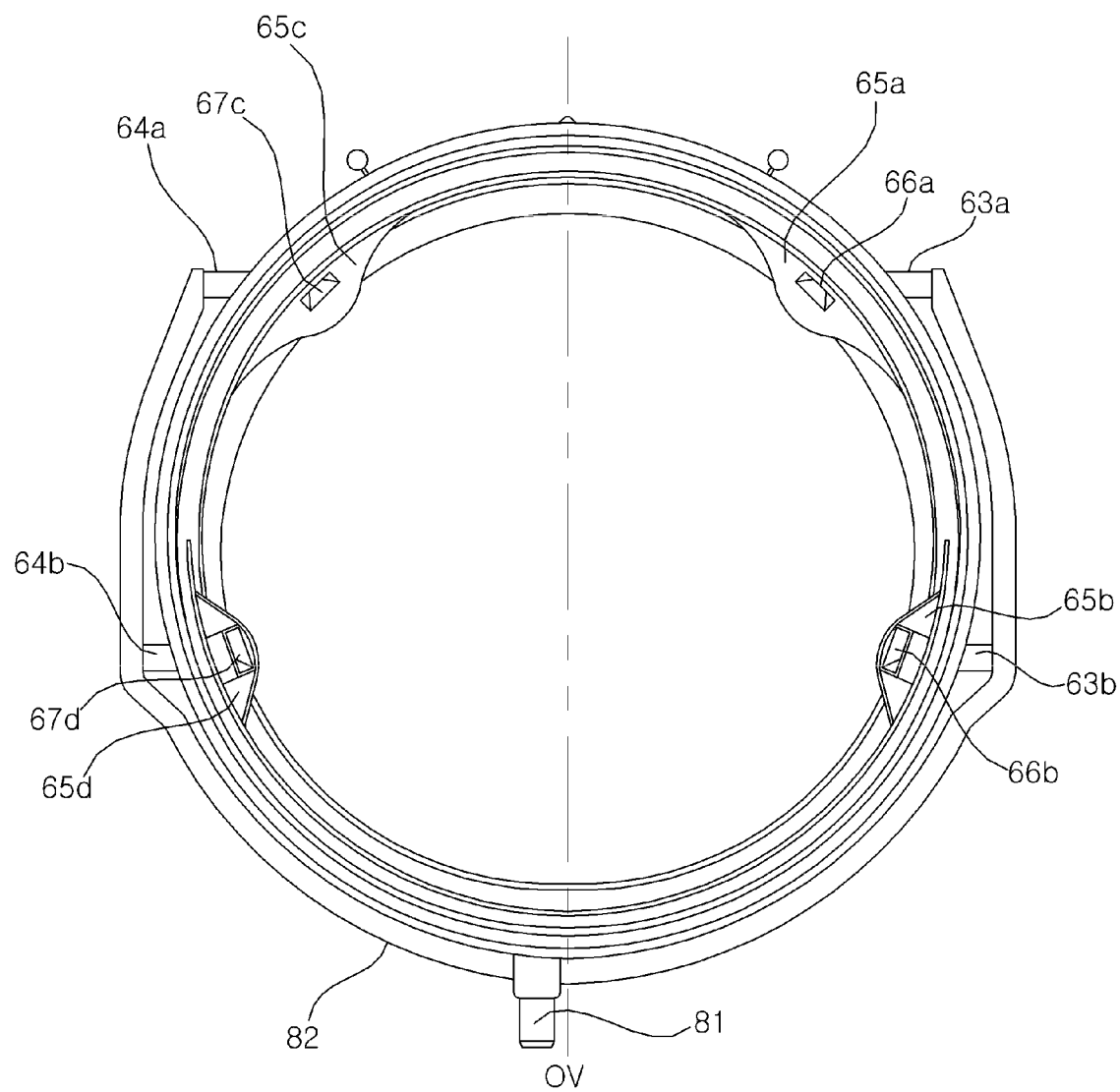
FIG. 6 is a rear view of an assembly including the gasket and a circulating water supply pipe illustrated in FIG. 4.

Referring to FIGS. 3 to 5, the gasket 60 includes a passage 60P which connects the laundry inlet 12 of the casing 10 and the opening 32 of the tub 30 to each other. An inner peripheral surface facing a center direction of the gasket 60 may be referred to as the inner peripheral surface 62, and an outer peripheral surface opposite to the inner peripheral surface may be referred to as an outer peripheral surface 61.

The inner peripheral surface 62 of the gasket 60 forms the passage 60P which connects the laundry inlet 12 and the opening 32 to each other. The outer peripheral surface 61 of the gasket 60 may face an inner peripheral surface 90a of the balancer 90. The outer peripheral surface 61 of the gasket 60 may face the circulating water supply pipe 80.

The gasket 60 is disposed between an inlet rim of the front panel 11 forming the laundry inlet 12 and a rim of the tub 30 forming the opening 32, and prevents the washing water stored in the tub 30 from leaking from the tub 30.

In more detail, the gasket 60 is formed of a flexible material such as rubber and has an approximately cylindrical shape (hereinafter, also referred to as a tubular shape). A front edge of the gasket 60 is connected to the inlet rim of the front panel 11, a rear edge of the gasket is connected to the opening rim of the tub 30, and the body portions 61 and 62 connecting the front and rear edges of the gasket 60 to each other form a laundry inlet passage. When a portion between the tub and the front panel is sealed and the door 20 is closed, the door 20 and a distal end of the gasket 60 come into close contact with each other, a portion between the door 20 and the gasket 60 is sealed, and thus, the leakage of the washing water is prevented.

Each of a front end and a rear end of the gasket 60 is formed in an annular shape, and the gasket 60 has a tubular shape extending from the front end to the rear end. The front end of the gasket 60 is fixed to the casing 10 and the rear end thereof is fixed to an inlet periphery 33 of the tub 30. The gasket 60 may be formed of a flexible or elastic material. The gasket 60 may be formed of natural rubber or a synthetic resin.

Hereinafter, a portion defining a tubular inner side of the gasket 60 may be referred to as an inner peripheral portion 62 (or inner peripheral surface) of the gasket and a portion opposite to the inner peripheral portion 62 may be referred to as an outer peripheral portion 61 (or outer peripheral surface).

The gasket 60 may include a casing coupling portion (not illustrated) which is coupled to the periphery of the inlet 12 of the casing 10, a tub coupling portion which is coupled to the inlet periphery 33 of the tub 30, and the body portions 61 and 62 which extend between the casing coupling portion and the tub coupling portion.

Each of the casing coupling portion and the tub coupling portion is formed in an annular shape, and the body portion may include an annular front end connected to the casing coupling portion and an annular rear end connected to the tub coupling portion and may have a tubular shape extending from the front end to the rear end.

In the front 11, the periphery of the inlet 12 is curled inward, and the casing coupling portion can be fitted into a concave portion formed by the curled portion.

The casing coupling portion may include an annular groove around which a wire is wound. After the wire is wound around the groove, both ends of the wire are connected to each other, and thus, the casing coupling portion is firmly fixed to the periphery of the inlet 12 of the tub 30.

In the tub 30, the inlet periphery 33 forming the opening 32 of the tub 30 protrudes from a front surface 31 and is curled outward, and the tub coupling portion is fitted into a concave portion formed by the curled portion. The tub coupling portion (not illustrated) may include an annular groove around which a wire is wound. After the tub coupling portion of the gasket is coupled to the inlet periphery 33 of the tub and the wire is wound along the groove, both ends of the wire are connected to each other, and thus, the tub coupling portion is firmly fixed to the inlet periphery 33.

Meanwhile, the casing coupling portion is fixed to the front panel 11 but the tub coupling portion is displaced according to a movement of the tub 30. Accordingly, the body portion should be deformed according to the displacement of the tub coupling portion. In order to smoothly realize the displacement, the gasket 60 may include a folding portion, which is folded when being moved in a direction (or, a radial direction) in which the tub 30 is moved by eccentricity, between a section (or body portion) between the casing coupling portion and the tub coupling portion.

The gasket 60 may include connectors 63 and 64 having holes communicating with the nozzles 66 and 67. The connectors 63 and 64 may be formed to protrude from the outer peripheral surface 61 of the gasket 60. Discharge ports 83 and 84 described later are inserted into the connectors 63 and 64, the connectors 63 and 64 are formed to protrude from the outer peripheral surface 61 of the gasket 60, and thus, the water supplied from the circulating water supply pipe 80 to the nozzles 66 and 67 is prevented from leaking between the connectors 63 and 64 and the discharge ports 83 and 84.

As in the above-described nozzles 66 and 67, a plurality of connectors 63 and 64 may be provided, and the number of the connectors 63 and 64 may be the same as that of the nozzles 66 and 67. The connectors 63 and 64 include the first connector 63 which has the hole communicating with the first nozzle 66 and the second connector 64 which has the hole communicating with the second nozzle 67. The first connector may be disposed on a left side of the gasket outer peripheral surface 61 and the second connector 64 may be disposed on a right side of the gasket outer peripheral surface 61.

The first connector 63 may include a first lower connector 63b which is disposed below the center of the gasket 60 and a first upper connector 63a which is disposed above the first lower connector 63b. The first upper connector 63a may be disposed above the center of the gasket 60. The first lower connector 63b has a hole communicating with the first lower nozzle 66b and the first upper connector 63a has a hole communicating with the first upper connector 63a.

The second connector 64 may include a second lower connector 64b which is disposed below the center of the gasket 60 and a second upper connector 64a which is disposed above the second lower connector 64b. The second upper connector 64a may be disposed above the center of the gasket 60. The second lower connector 64b has a hole communicating with the second lower nozzle 67b and the second upper connector 64a has a hole communicating with the second upper connector 64a.

Meanwhile, a protrusion 65 may protrude inward from the inner peripheral surface 62 of the gasket at a portion corresponding to the connectors 63 and 64, and the nozzle 66 may be formed at the protrusion 65.

The protrusion 65 may include first to fourth protrusions 65a, 65b, 65c, and 65d which protrude inward at portions corresponding to the first upper and lower connectors 63a and 63b and the second upper and lower connectors 64a and 64b. The first upper and lower nozzles 66a and 66b and the second upper and lower nozzles 67a and 67b may be formed in the first to fourth protrusions 65a, 65b, 65c, and 65d.

Figure 7:
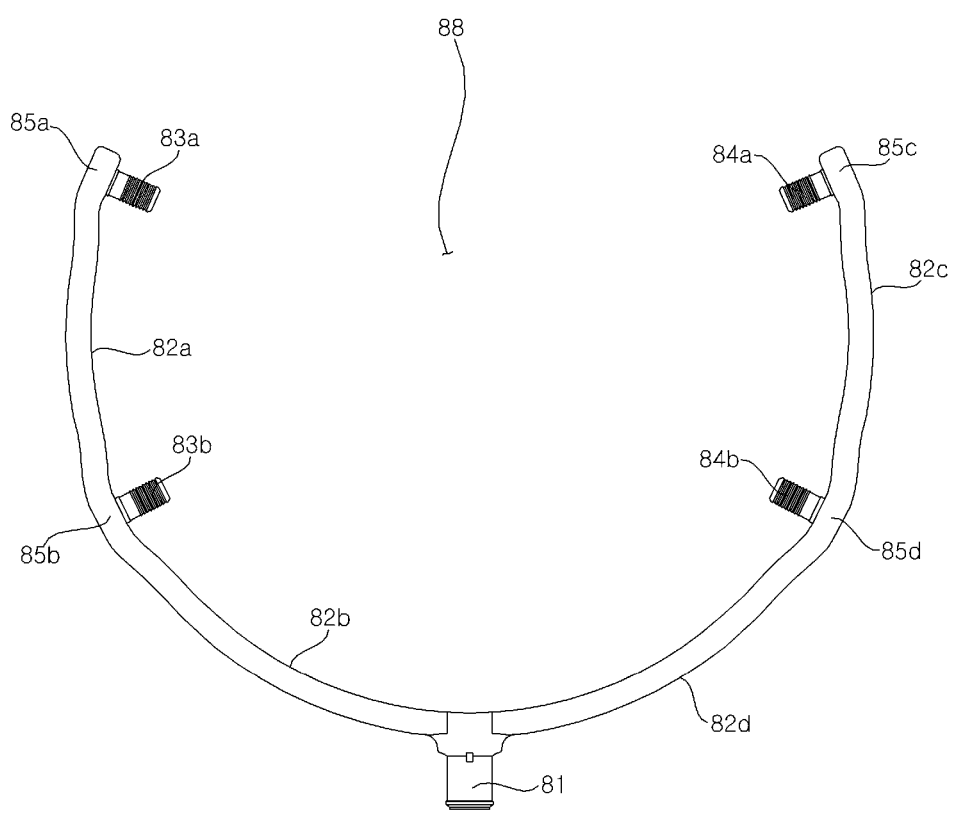
FIG. 7 is a front view of the circulating water supply pipe illustrated in FIG. 4.
Figure 8:
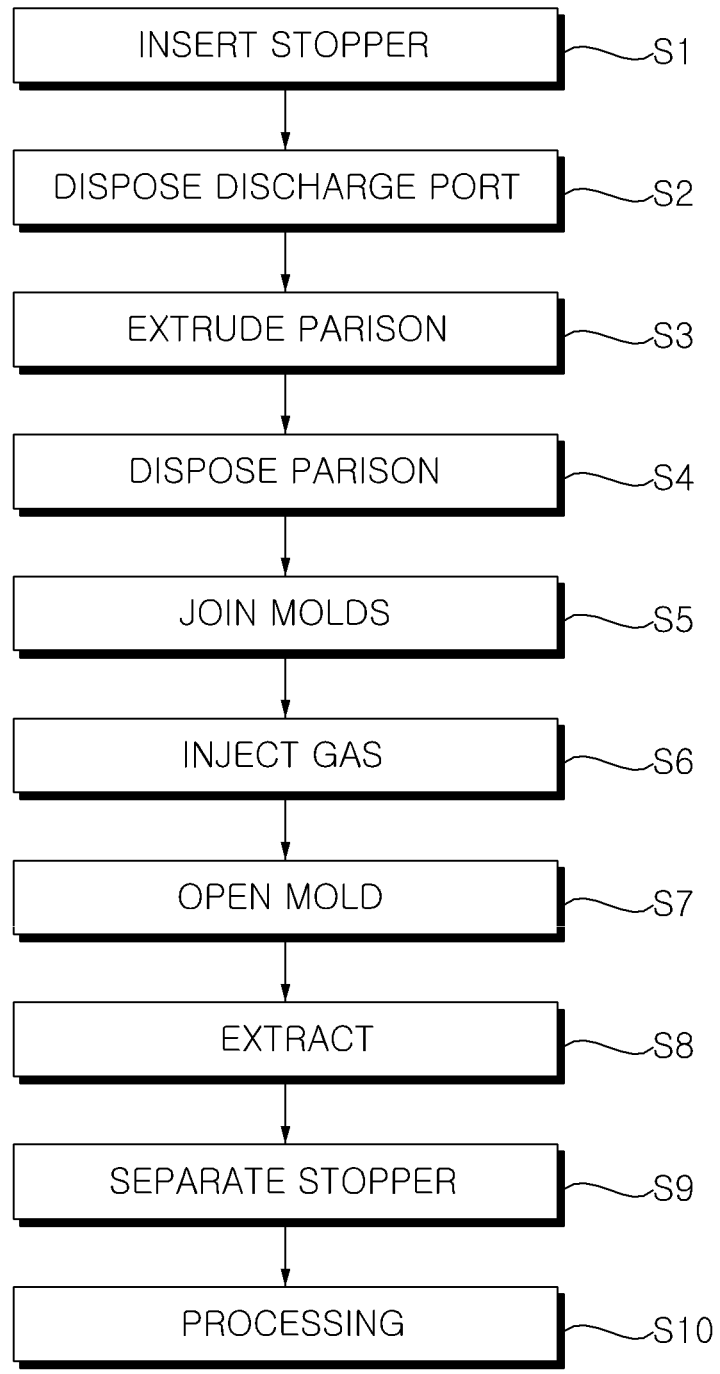
FIG. 8 is a flowchart illustrating a manufacturing method of the circulating water supply pipe according to an embodiment of the present disclosure.
Figure 9A:
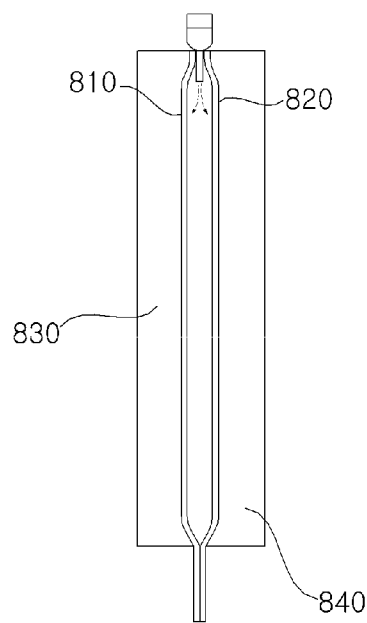
FIG. 9A is a view schematically illustrating a state where molds are joined to each other according to a manufacturing method of the related art and FIG. 9B is a view illustrating a state where the mold is open.
Figure 9B:
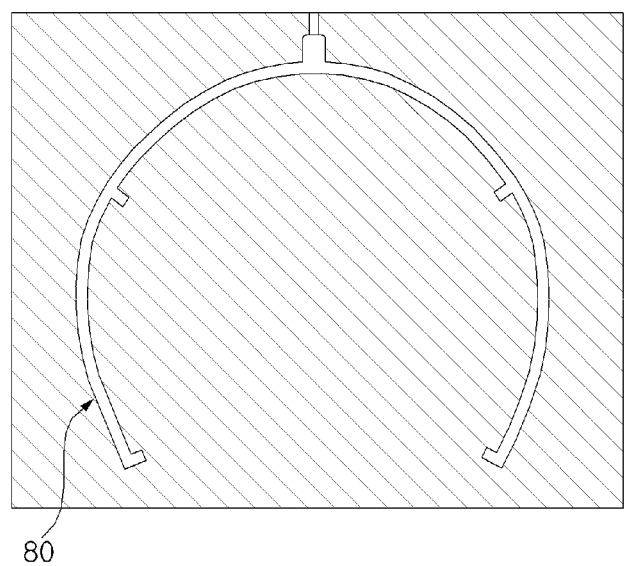

Referring to FIGS. 4 and 7, the circulating water supply pipe 80 includes an inlet port 81 into which the water pressure-fed from the pump 70 flows, a feeding conduit 82 which guides the water introduced through the inlet port 81, and the discharge ports 83 and 84 which protrude from the feeding conduit 82 to the gasket 60 and distribute the water guided along the feeding conduit 82 into the plurality of nozzles 66 and 67.

The circulating water supply pipe 80 may be disposed on the outer peripheral surface 61 of the gasket 60. The circulating water supply pip 80 is disposed between the outer peripheral surface 61 of the gasket 60 and the balancer 90. Accordingly, the circulating water supply pipe 80 can be installed without having to secure a separate space.

The circulating water supply pipe 80 may be formed in a ring shape of which an upper portion 88 is open. That is, the circulating water supply pipe 80 includes the inlet portion 81 into which the water pumped from the pump 70 flows, one or more discharge ports 83 and 84 which discharge the introduced water so that the water is injected into the drum 40, and the feeding conduit 82 which connects the inlet port 81 and the discharge ports 83 and 84 to each other, in which one end of left conduit portions 82a and 82b of the feeding conduit 82 and one end of right conduit portions 82c and 82d are connected to each other at a position at which the inlet port 81 is provided, and the other end of the left conduit portions 82a and 82b and the other end of the right conduit portions 82c and 82d are separated from each other.

The inlet port 81 may be formed to protrude downward at a lower portion of the feeding portion 82, and the discharge ports 83 and 84 may be formed to protrude inward (or toward the gasket side) on left and right sides of the circulating water supply pipe 80. The connection pipe 86 may be disposed between the inlet port 81 and a drain port 78 formed in the pump 70, and thus, the washing water in the tub can flow into the inlet port 81 through the connection pipe 86.

The inlet port 81 is connected to the feeding conduit 82 below any one of the plurality of discharge ports 83 and 84.

The feeding conduit 82 divides the circulating water introduced from the inlet port 81 into a first partial stream and a second partial stream. The first partial stream may be injected into the drum 40 through the first nozzle 66 and the second partial stream may be injected into the drum 40 through the second nozzle 67.

The feeding conduit 82 may include an inner diameter portion 82i through which the water introduced from the inlet port 81 flows. A plurality of communication ports 82h communicating with a discharge flow path F described later may be formed in the inner diameter portion of the feeding conduit. The water flowing through the inner diameter portion 82i of the feeding conduit may flow into the discharge ports 83 and 84 through the communication port 82h.

The feeding conduit 82 may be disposed between the gasket 60 and the balancer 90. An inner surface of the feeding conduit 82 is disposed to face the gasket 60 and an outer surface thereof is disposed to face to the balancer 90.

The discharge ports 83 and 84 protrude toward the center of the gasket 60 from the feeding conduit 82 at positions corresponding to the nozzles (or connectors) and are inserted into the connectors 63 and 64. The discharge ports 83 and 84 guide the circulating water flowing along the feeding conduit 82 to the nozzles 66 and 67 so that the circulating water is injected into the drum 40.

A diameter of each of the discharge ports 83 and 84 is formed to be slight larger than a diameter of each of the connectors 63 and 64 so that the discharge ports 83 and 84 can be press-fitted into the connector 63 and 64. When the circulating water flows from the discharge ports 83 and 84 toward the nozzles 66 and 67, a force may act on the discharge portion 85 in the opposite direction to the gasket 60 by a reaction. In order to prevent the circulating water supply pipe 80 from being removed from the gasket 60 by the reaction force, as described above, the connectors 63 and 64 may be formed to protrude outward from the outer peripheral surface 61 of the gasket 60, the diameters of the discharge ports 83 and 84 may be formed to be slightly larger than the diameters of the connectors 63 and 64, and protrusions may be formed along peripheries of outer diameter portions of the discharge ports 83 and 84 to increase a friction force.

The discharge ports 83 and 84 include a first discharge port 83 which protrudes from the first discharge portions 85*a* and 85*b* toward the center of the gasket 60 and a second discharge port 84 which protrudes from the second discharge portions 85*c* and 85*d* toward the center of the gasket 60. The first discharge port 83 is inserted into the first connector 63 to guide the circulating water to the first nozzle 66 and the second discharge port 84 is inserted into the second connector 64 to guide the circulating water to the second nozzle 67.

The first discharge port 83 may include a first lower discharge port 83*b* which is inserted into the first lower connector 63*b* and a first upper discharge port 83*a* which is inserted into the first upper connector 63*a*. The first lower discharge port 83*b* and the first upper discharge port 83*a* respectively protrude from the first lower discharge portion 85*b* and the first upper discharge portion 85*a*, and are respectively inserted into the first upper connector 63*a* and the first lower connector 63*b* to guide the circulating water to the first upper nozzle 66*a* and the first lower nozzle 66*b*.

The second discharge port 84 may include a second lower discharge port 84*b* which is inserted into the second lower connector 64*b* and a second upper discharge port 84*a* which is inserted into the second upper connector 64*a*. The second lower discharge port 84*b* and the second upper discharge port 84*a* respectively protrude from the second lower discharge portion 85*d* and the second upper discharge portion 85*c*, and are respectively inserted into the second upper connector 64*a* and the second lower connector 64*b* to guide the circulating water to the second upper nozzle 67*a* and the second lower nozzle 67*b*.

Referring to FIGS. 11A to 11C, each of the discharge ports 83 and 84 includes a discharge flow path surface 89, which defines the discharge flow path F communicating with each of the nozzles 66 and 67, inside each discharge port. The water flowing along the inner diameter portion 82*i* of the feeding conduit flows toward the discharge ports 83 and 84 through the communication port 82*h*, and forms the discharge flow path F along the discharge flow path surface 89 to flow toward the nozzles 66 and 67.

The discharge flow path surface 89 includes not only inner surfaces of the discharge ports 83 and 84 but also a surface of the above-described feeding conduit 82 forming the communication port 82*h*. That is, the discharge flow path surface 89 may be formed so as to extend to the communication port 82*h*.

The discharge flow path surface 89 may include a first discharge flow path surface 89*a* which is formed inside each of the discharge ports 83 and 84 and a second discharge flow path surface 89*b* corresponding to the communication port 82*h* of the feeding conduit. That is, the first discharge flow path surface 89*a* is an inner surface of each of the discharge ports 83 and 84 and the second discharge flow path surface 89*b* is a peripheral surface forming the communication port 82*h*.

In a manufacturing process of the circulating water supply pipe 80 described later, a parting line 83P may be formed on the discharge flow path surface 89. A parison 800 which is a material of the feeding conduit 82 is input along the discharge flow path F of each of the discharge ports 83 and 84 by injecting gas, molds of the feeding conduit 82 and the discharge ports 83 and 84 are joined to each other, and thereafter, the parting line 83P remains while the parison 800 remaining on the discharge ports 83 and 84 is removed. Accordingly, the parting line 83P is formed of the same material as that of the feeding conduit 82. The parting line 83P may be formed to protrude from the discharge flow path surface 89 toward a center of a periphery of the discharge flow path surface 89.

As descried later, in the manufacturing process of the circulating water supply pipe 80, a stopper (not illustrated) for preventing the parison 800 flowing into the discharge ports 83 and 84 may be inserted and the molds of the discharge ports 83 and 84 and the feeding conduit may be joined to each other. The parison 800 flows into the discharge ports 83 and 84 by the gas injection but can flow only to a portion into which the stopper is inserted. For example, the stopper may be a cylindrical object or a rod having a shape corresponding to the discharge port.

If the stopper is separated after the molds of the circulating water supply pipe 80 are joined to each other, the parting line 83P may be formed at a position at which the stopper is inserted. Alternatively, the discharge flow path F may be closed by a residue of the parison 800 at the position at which the stopper is inserted. When the discharge flow F is closed by the residue of the parison 800, the residue of the parison 800 can be removed in the subsequent process. Even when the residue of the parison 800 is removed, a long time and a large cost are required to completely remove the residue of the parison 800 from the discharge flow path surface 89. Accordingly, the parting line 83P may be formed on the discharge flow path surface 89.

According to the above-described processes, the parting line 83P may be formed in a ring shape along the periphery of the discharge flow path surface 89. Alternatively, in some cases, the parting line 83P may be formed in an arc shape instead of a complete ring shape.

Meanwhile, one end 83*e*1 of both ends of each of the discharge ports 83 and 84 is an end 83*e*1 facing each of the nozzles 66 and 67, and the other end 83*e*2 thereof is an end 83*e*2 connected to the feeding conduit 82.

The position at which the parting line is formed is changed according to the position at which the stopper is inserted. When the stopper is not inserted or the stopper is inserted to a position closer to the one end 83*e*1 than the other end 83*e*2 and the circulating water supply pipe is manufactured, the residue of the parison 800 may remain not only on the inner surface of each of the discharge ports 83 and 84, that is, in a circumferential direction of the discharge flow path surface 89 but also in a longitudinal direction. In this case, it is difficult to completely remove the residue and a diameter and a cross-sectional shape of the discharge flow path surface 89 cannot be uniformly formed. Accordingly, there are problems that a flow resistance increases and the residue of the parison 800 is ejected into the drum 40 when a user uses the washing machine.

Accordingly, the stopper may be inserted to a position closer to the other end 83e2 than the one end 83e1 so that the circulating water supply pipe 80 is manufactured. In this case, the parting line 83P may be formed on the first discharge flow path surface 89a and may be formed to be closer to the other end 83e2 than the one end 83e1 of each of the discharge ports 83 and 84 in the first discharge flow path surface 89a.

Alternatively, the circulating water supply pipe 80 may be manufactured after the stopper is inserted to a position corresponding to the communication port 82h of the feeding conduit 82. In this case, the parting line 83P may be formed on the second discharge flow path surface 89b.

When the circulating water supply pipe 80 is manufactured after the stopper is inserted to a position corresponding to the communication port 82h of the feeding conduit 82, the inner surfaces of the discharge ports 83 and 84 can be more smoothly formed. However, there is a disadvantage that it is difficult to remove the residue of the parison 800 using a drill or the like due to an interference of the feeding conduit 82.

More specifically, the inner diameter portion 82i of the feeding conduit 82 is disposed on the outer peripheral surface 61 of the gasket 60, and a distance between a surface on which the communication port 82h is formed and a surface opposite to the surface on which the communication port 82h is formed is short due to limitation of a disposition space. A tool such as a drill is inserted into a hole formed on the one end of the discharge port to remove the residue of the parison 800. In this process, the tool can be inserted only to the surface opposite to the surface on which the connection port is formed in order to remove the residue of the parison formed on the second discharge flow path surface 89b. Accordingly, not only the residue of the parison is present to form the parting line 83P but the residue may also be agglomerated to be suspended on the discharge flow path surface. In this case, when the washing machine is used, there is a problem that the residue of the parison may be ejected into the drum.

Meanwhile, the parting line 83P cannot be separated from the discharge flow path surface 89 even when the water strongly flows along the discharge flow path F as the residue (or a configuration having the same material as that of the feeding conduit 82) of the parison 800 strongly adhering to the discharge flow path surface 89, and thus, the parting line 83P formed on the discharge flow path surface 89 is different from the residue of the parison 800 in which the above-described problems occur.

Accordingly, in the embodiment of the present disclosure, preferably, the parting line 83P is formed on the first discharge flow path surface 89a. In addition, more preferably, the parting line 83P is formed on the first discharge flow path surface 89a but is formed to be closer to the end 83e2 connected to the feeding conduit 82 of the discharge ports 83 and 84 than to the end 83e1 facing the nozzles 66 and 67 of the discharge ports 83 and 84.

One end of the connection pipe 86 is connected to the inlet port 81 protruding from a lower portion of the circulating water supply pipe 80 and the other end thereof is connected to the drain port 78 of the pump 70. When the pump 70 is provided at a position which the drain port 78 linearly faces the inlet port 81, the connection pipe 86 may have a linear pipe shape. However, in other cases, the connection pipe 86 may be formed to be bent.

When the connection pipe 86 is formed to be bent, the connection pipe 86 may include a first connection portion of which one end is connected to the inlet port 81 of the circulating water supply pipe and which is formed to extend downward, a second connection portion which is bent rearward from the first connection portion and is located below the tub 30, a third connection portion which is bent from the second connection portion to the pump side, and a fourth connection portion which is bent downward from the third connection portion and is connected to the pump 70.

The first to fourth connection portions may be respectively formed to be coupled to each other or may be formed integrally. The connection pipe 86 may be formed of a material which is flexible but can maintain a shape, and may be formed of ethylene propylene diene monomer rubber (EPDM) in an embodiment of present disclosure. The fourth connection portion may include a bellows structure.

Referring to FIG. 3, the balancer 90 may be fastened to the front surface 31 of the tub 30. The balancer 90 is disposed outside the front surface 31 of the tub 30 and the gasket 60. The balancer 90 is provided to reduce vibrations of the tub 30 and is a weight body having a predetermined weight.

Hereinafter, a manufacturing method of the circulating water supply pipe 80 will be described with reference to FIGS. 8 to 11C.

The manufacturing method of the circulating water supply pipe 80 according to an embodiment of the present disclosure includes inserting the stopper into the plurality of discharge ports 83 and 84, locating the discharge ports 83 and 84 into which the stopper is inserted in a cavity of a lower mold 850, extruding a raw material to form the melted parison 800 having a hollow, placing the parison 800 in the cavity of the lower mold 850, joining an upper mold 860 and the lower mold 850 to each other, injecting a gas into the hollow, opening the upper mold 860 and the lower mold 850, extracting a molding product obtained by joining the parison 800 and the plurality of discharge ports 83 and 84 to each other from the cavity, and separating the stopper inserted into the discharge ports 83 and 84. In addition, the manufacturing method may include removing the parison 800 in the plurality of discharge ports 83 and 84 after separating of the stopper.

In the manufacturing method of the circulating water supply pipe 80, first, the stopper is inserted into the prepared discharge ports 83 and 84 through the hole formed on the one end 83e1 facing the nozzles 66 and 67 (S1). Here, the plurality of discharge ports 83 and 84 may be formed in advance, and, preferably, may be injection molded products.

Thereafter, in a state where the plurality of discharge ports 83 and 84 are inserted into the mold, the feeding conduit 82 is formed through extrusion molding using the melted parison 800. The discharge ports 83 and 84 may be injection molded products, and a material thereof may be the same as that of the parison 800 or may be different from that of the parison 800.

The mold may include the lower mold 850 and the upper mold 860. The lower mold 850 may include a first cavity corresponding to an outline of a portion of a lower side (preferably, an approximately lower half portion) of the circulating water supply pipe 80 located horizontally, and the cavity has a shape of which an upper surface is open so that the parison 800 described later is placed in the cavity.

The upper mold 860 is joined to the lower mold 850 from above the lower mold 850. Accordingly, the upper mold 860 includes a second cavity corresponding to a remaining portion (an approximately upper half portion) of the circulating water supply pipe 80 except for the portion formed by the cavity formed in the lower mold 850.

FIG. 10A illustrates a state where the molds 850 and 860 are open and the plurality of discharge ports 83 and 84 are located in the first cavity of the lower mold 850. Here, the plurality of discharge ports 83 and 84 may be formed in advance, and preferably, are injection molded products.

Each of the plurality of discharge ports 83 and 84 is a so-called insert which is embedded in the melted parison 800 input into the cavity in Step S4 described later. According to the embodiment, the inlet port 81 formed in advance may be located in the cavity of the lower mold 850 before Step S4.

Thereafter, a raw material or a material forming the feeding conduit 82 is extruded to form the melted parison 800 having a hollow. The parison is output to be long in a tubular shape by an extruder (not illustrated), and thus, a temperature at the time of the output from the extruder is approximately 195° C. to 205° C., and preferably, 200° C.

The parison 800 output from the extruder may be placed in the cavity in which the insert (discharge ports 83 and 84 and/or inlet port 81) is located in Step S2 (S4). In Step S4, after the parison 800 output from the extruder may be cut in an approximate length, the parison 800 may be placed in the cavity. The cutting of the parison 800 and inputting of the parison 800 into the cavity may be performed a in facility. However, the present disclosure is not limited thereto, the cutting and inputting can be performed manually.

In the state where the parison 800 is placed in the cavity of the lower mold 850, the upper mold 860 and the upper mold 850 are joined to each other (S5). In this case, both open ends of the parison 800 is pressed by the upper mold 860 and the lower mold 850 and is closed. In this state, a high-pressure gas is injected through the gas injection path 870 formed in the molds 850 and 860 (S6). The gas may be air but is not necessarily limited thereto. A process of injecting the high-pressure gas is a technique widely used in hollow extrusion molding, and thus a detailed description thereof will be omitted. Preferably, the temperature of the parison 800 when the injection of the gas starts is 180° C. to 190° C.

The hollow in the parison 800 is expanded while the gas is injected, and thus, the parison 800 comes into close contact with the inner surface of the cavity of the molds 850 and 860 to form the feeding conduit 82. When the gas having a lower temperature than that of the parison 800 is injected, the temperature of the parison 800 may naturally decrease while the gas is injected. However, the present disclosure is not limited thereto, forcibly cooling the temperature of the parison 800 may be further performed or waiting for natural cooling may be further performed before the mold is opened.

Thereafter, mold opening is performed in which the upper mold 860 and the lower mold 850 are opened (S7), a molding product (according to an embodiment, when the inlet port 81 is constituted by a separate insert, the molding product further includes the inlet port 81) in which the parison 800 and the plurality of discharge ports 83 and 84 are joined to each other is extracted from the cavity (S8).

The stopper is separated from the discharge ports 83 and 84 of the extracted molding product (S9). While the gas is injected, the expanded parison 800 enters at the position at which the stopper is inserted into the discharge flow path surface 89 of the discharge ports 83 and 84. Accordingly, the discharge flow path F may be closed by the parison 800.

Accordingly, a processing step (S10) for drilling the closed conduit is performed. The closed discharge flow path F may be opened by using automatic drilling equipment or by a manual operation. In this case, according to the embodiment, when the inlet port 81 is inserted, the inlet port 81 may be drilled similarly to the method for drilling the discharge ports 83 and 84.

Meanwhile, when the inlet port 81 is not constituted by a separate insert, processing the inlet port 81 communicating the hollow of the parison 800 in the molding product (the shape in which the plurality of discharge ports 83 and 84 and the parison 800 are joined to each other) extracted from the molds 850 and 860 may be further performed.

Hereinbefore, preferred embodiments of present disclosure are illustrated and described. However, present disclosure is not limited to the specific embodiments described above, the present disclosure may be variously modified by those skilled in the art without departing from a scope of the present disclosure claimed in the claims, and the modifications should not be understood individually from a technical spirit or outlook of the present disclosure.

According to the washing machine of the present disclosure, the following one or more effects are exerted.

First, a material used in the manufacturing process of the circulating water supply pipe is reduced, and thus, it is possible to improve productivity.

Second, in the manufacturing process of the circulating water supply pipe, the stopper is inserted into the discharge port. Accordingly, the parison is prevented to be input, only the parting line slightly protruding from the discharge flow path surface which is the inner surface of the discharge port is formed, and thus, the diameter of the discharge flow path surface is uniform and the discharge flow path surface can be smoothly manufactured.

Third, the residue of the parison existing on the discharge flow path surface can be easily removed by the stopper, and when the user uses the washing machine, the residue can be prevented from being ejected into the drum.

Effects of the present disclosure are not limited to the above-described effects, and other effects not mentioned are clearly understood by a person skilled in the art.

What is claimed is:

1. A washing machine comprising:
  a casing that defines a laundry inlet at a front surface;
  a tub that is disposed in the casing and that defines a tub opening at a front surface of the tub;
  a drum rotatably disposed in the tub;
  a pump configured to pump water discharged from the tub;
  a gasket that defines a passage that connects the laundry inlet to the tub opening;
  a plurality of nozzles disposed on an inner peripheral surface of the gasket and configured to inject water pumped by the pump into the drum; and
  a circulating water supply pipe that is disposed on an outer peripheral surface of the gasket opposite to the inner peripheral surface, the circulating water supply pipe being configured to guide the water from the pump to the plurality of nozzles,
  wherein the circulating water supply pipe comprises:
    an inlet port configured to receive the water from the pump,
    a feeding conduit made of a first material and configured to guide the water received through the inlet port toward the plurality of nozzles, and
    a plurality of discharge ports that protrude from the feeding conduit toward the gasket and that are configured to supply the water guided along the feeding conduit to the plurality of nozzles, and
  wherein at least one of the feeding conduit or each of the plurality of discharge ports comprises:
    a discharge flow path surface that defines a discharge flow path that is in communication with one of the plurality of nozzles, and a parting line that is disposed on the discharge flow path surface and that is made of the first material.

2. The washing machine of claim 1, wherein the parting line has a ring shape and extends along a periphery of the discharge flow path surface.

3. The washing machine of claim 1, wherein the parting line has an arc shape and extends along a periphery of the discharge flow path surface.

4. The washing machine of claim 1, wherein the feeding conduit comprises:
   an inner diameter portion that is configured to guide the water introduced from the inlet port, the inner diameter portion comprising a plurality of communication ports, each of the plurality of communication ports being in communication with one of the plurality of discharge ports, and
   wherein the discharge flow path surface extends from one of the plurality of communication ports to one of the plurality of the discharge ports.

5. The washing machine of claim 4, wherein the discharge flow path surface comprises:
   a first discharge flow path surface disposed inside the one of the plurality of discharge ports, and
   a second discharge flow path surface disposed inside the one of the plurality of communication ports.

6. The washing machine of claim 5, wherein the parting line is disposed on the first discharge flow path surface.

7. The washing machine of claim 6, wherein each of the plurality of discharge ports has a first end connected to the feeding conduit and a second end facing one of the plurality of nozzles, and
   wherein the parting line is disposed closer to the first end than to the second end.

8. The washing machine of claim 5, wherein the parting line is disposed on the second discharge flow path surface.

9. The washing machine of claim 5, wherein the first discharge flow path surface is flush with the second discharge flow path surface.

10. The washing machine of claim 1, wherein each of the plurality of discharge ports has a first end connected to an inner surface of the feeding conduit and a second end connected to one of the plurality of nozzles, and
    wherein the discharge flow path extends from the inner surface of the feeding conduit to an inner surface of one of the plurality of discharge ports.

11. The washing machine of claim 10, wherein the inner surface of the feeding conduit covers and surrounds the first end of the one of the plurality of discharge ports.

12. The washing machine of claim 10, wherein the parting line is disposed at the inner surface of the feeding conduit or at the inner surface of the one of the plurality of discharge ports.

13. The washing machine of claim 1, wherein the parting line is recessed from the discharge flow path surface.

14. The washing machine of claim 1, wherein the parting line protrudes from the discharge flow path surface.

15. The washing machine of claim 1, wherein each of the plurality of discharge ports is a separate part that is coupled to the feeding conduit by molding.

* * * * *